(12) United States Patent
Eldar et al.

(10) Patent No.: US 10,983,059 B2
(45) Date of Patent: Apr. 20, 2021

(54) SPARSITY-BASED SUPER-RESOLUTION CORRELATION MICROSCOPY

(71) Applicant: TECHNION RESEARCH & DEVELOPMENT FOUNDATION LTD., Haifa (IL)

(72) Inventors: Yonina Eldar, Haifa (IL); Mordechai Segev, Haifa (IL); Oren Solomon, Ashdod (IL); Maor Mutzafi, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 90 days.

(21) Appl. No.: 16/484,123

(22) PCT Filed: Jan. 16, 2018

(86) PCT No.: PCT/IB2018/050253
§ 371 (c)(1),
(2) Date: Aug. 7, 2019

(87) PCT Pub. No.: WO2018/146562
PCT Pub. Date: Aug. 16, 2018

(65) Prior Publication Data
US 2020/0003693 A1 Jan. 2, 2020

Related U.S. Application Data
(60) Provisional application No. 62/456,714, filed on Feb. 9, 2017.

(51) Int. Cl.
G01N 21/64 (2006.01)
G06T 3/40 (2006.01)
G06T 5/10 (2006.01)
G06T 5/50 (2006.01)

(52) U.S. Cl.
CPC ..... *G01N 21/6458* (2013.01); *G01N 21/6408* (2013.01); *G06T 3/4053* (2013.01);
(Continued)

(58) Field of Classification Search
CPC ........... G01N 21/6458; G01N 21/6408; G01N 21/64; G06T 3/4053; G06T 5/10;
(Continued)

(56) References Cited

U.S. PATENT DOCUMENTS

2010/0303386 A1* 12/2010 Enderlein .......... H04N 5/23232
382/299
2014/0192042 A1 7/2014 McClure
(Continued)

OTHER PUBLICATIONS

International application # PCT/IB2018/050253 search report dated May 21, 2018.
(Continued)

*Primary Examiner* — David P Porta
*Assistant Examiner* — Meenakshi S Sahu
(74) *Attorney, Agent, or Firm* — Kligler & Associates Patent Attorneys Ltd

(57) ABSTRACT

An imaging apparatus (20) includes an interface (50) and a processor (30). The interface is configured to receive a sequence of images of an object (38) acquired at respective acquisition times, the object is labeled with fluorescent emitters. The images depict intensity fluctuations of emitters on an acquisition grid, and the intensity fluctuations being uncorrelated among the emitters and during an overall time over which the images in the sequence are acquired. The a processor is configured to calculate a temporal correlation function of the intensity fluctuations over the sequence of images, and to estimate locations of the emitters on a super-resolution grid having a higher resolution than the acquisition grid, by applying to the temporal correlation function a recovery process in which the locations on the
(Continued)

super-resolution grid are assumed to be sparse or compressible in a predefined domain. The recovery process includes a sparse-recovery process or a regularized process.

24 Claims, 2 Drawing Sheets

(52) U.S. Cl.
CPC .................. *G06T 5/10* (2013.01); *G06T 5/50* (2013.01); *G06T 2207/10016* (2013.01); *G06T 2207/10056* (2013.01); *G06T 2207/10064* (2013.01); *G06T 2207/30024* (2013.01)

(58) Field of Classification Search
CPC ............. G06T 5/50; G06T 2207/10016; G06T 2207/10056; G06T 2207/10064; G06T 2207/30024; G06T 2207/20056; G06T 5/003; G02B 21/0076; G02B 27/58
See application file for complete search history.

(56) References Cited

U.S. PATENT DOCUMENTS

| 2016/0048963 | A1* | 2/2016 | Piestun | G06K 9/00 382/154 |
| 2016/0371563 | A1 | 12/2016 | Vidal et al. | |

OTHER PUBLICATIONS

Betzig et al., "Imaging intracellular fluorescent proteins at nanometer resolution," Science, vol. 313, issue 5793, pp. 1642-1645, Sep. 15, 2006.

Rust et al., "Sub-diffraction-limit imaging by stochastic optical reconstruction microscopy (STORM)," Nature Methods, vol. 3, No. 10, pp. 793-795, Oct. 2006.

Dertinger et al., "Fast, background-free, 3D super-resolution optical fluctuation imaging (SOFI)," Proceedings of the National Academy of Sciences of the United States of America, vol. 106, No. 52, pp. 22287-22292, Dec. 29, 2009.

Min et al., "FALCON: fast and unbiased reconstruction of high-density super-resolution microscopy data," Scientific Reports, vol. 4, 2014, article No. 4577, pp. 1-9, Apr. 3, 2014.

Solomon et al., "SPARCOM: Sparsity Based Super-Resolution Correlation Microscopy," arXiv Preprint, vol. 1707, No. 9255, pp. 1-23, Dec. 11, 2018.

Beck et al., "Fast gradient-based algorithms for constrained total variation image denoising and deblurring problems," IEEE Transactions of Image Processing, vol. 18, No. 11, pp. 2419-2434, Nov. 2009.

* cited by examiner

SPARSITY-BASED SUPER-RESOLUTION CORRELATION MICROSCOPY

CROSS-REFERENCE TO RELATED APPLICATIONS

This application claims the benefit of U.S. Provisional Patent Application 62/456,714, filed Feb. 9, 2017. This application is related to a U.S. patent application entitled "Sparsity-based ultrasound super-resolution imaging,", filed on even date. The disclosures of these related applications are incorporated herein by reference.

TECHNICAL FIELD

Embodiments described herein relate generally to imaging techniques, and particularly to methods and systems for fluorescence super-resolution microscopy.

BACKGROUND

Fluorescence imaging is based on detecting light emitted from photo-activated fluorophores pre-attached to features of interest within the imaged specimen. In response to illuminating the specimen, the fluorophores are randomly activated to emit light at a narrow range of wavelengths. The emitted light is captured by a light-sensitive detector that produces an image of the labeled features.

The ability to distinguish between closely spaced fluorophores is limited by the diffraction of light, known as Abbe's diffraction limit. An imaging system is typically characterized by a Point Spread Function (PSF) that causes point emitters such as fluorescence molecules to appear blurred and overlapping in the image.

Several fluorescence imaging techniques that enable imaging beyond the diffraction limit are known in the art. For example, the Photo-Activated Localization Microscopy (PALM) and Stochastic Optical Reconstruction Microscopy (STORM) methods are based on capturing multiple low-resolution images, and applying to the captured images super-localization methods, in which individual fluorophores are identified and localized accurately.

PALM is described, for example, by Betzig et al. in "Imaging intracellular fluorescent proteins at nanometer resolution," Science, volume 313, issue 5793, 2006, pages 1642-1645. STORM is described, for example, by Rust et al. in "Sub-diffraction-limit imaging by stochastic optical reconstruction microscopy (STORM)," Nature Methods, volume 3, number 10, 2006, pages 793-795.

Another approach, known as the Super-Resolution Optical Fluctuation (SOFI) method, has been proposed by Dertinger et al., in "Fast, background-free, 3D super-resolution optical fluctuation imaging (SOFI)," Proceedings of the National Academy of Sciences of the United States of America, volume 106, number 52, 2009, pages 22287-22292. Compared to PALM and STORM, the acquisition time in SOFI is significantly shorter, but the achievable spatial resolution is limited.

A high-resolution imaging method based on processing individual frames referred to as FALCON, is described, for example, by Min et al. in "FALCON: fast and unbiased reconstruction of high-density super-resolution microscopy data," Scientific Reports, volume 4, 2014, article number 4577, 2014.

SUMMARY

An embodiment that is described herein provides an imaging apparatus that includes an interface and a processor. The interface is configured to receive a sequence of images of an object acquired at respective acquisition times, the object is labeled with fluorescent emitters. The images depict intensity fluctuations of emitters on an acquisition grid, the intensity fluctuations being uncorrelated among the emitters and during an overall time over which the images in the sequence are acquired. The processor is configured to calculate a temporal correlation function of the intensity fluctuations over the sequence of images, and to estimate locations of the emitters on a super-resolution grid having a higher resolution than the acquisition grid, by applying to the temporal correlation function a recovery process in which the locations on the super-resolution grid are assumed to be sparse or compressible in a predefined domain. The recovery process includes a sparse-recovery process or a regularized process.

In some embodiments, in applying the recovery process, the processor is configured to distinguish between the estimated locations of emitters that overlap on the acquisition grid. In other embodiments, the processor is configured to calculate the temporal correlation function by calculating variances of the intensity fluctuations, and to apply the recovery process to the variances to find locations on the super-resolution grid having nonzero variances. In yet other embodiments, the processor is configured to transform the received images in the sequence to respective transform-domain vectors, and to calculate the temporal correlation function by calculating a measurement autocorrelation matrix of the transform-domain vectors, for a selected time-lag.

In an embodiment, the processor is configured to apply the recovery process by considering one or more nonzero off-diagonal elements of the measurement autocorrelation matrix. In another embodiment, the temporal correlation function and a super-resolution autocorrelation matrix of the intensity fluctuations of the emitters on the super-resolution grid are interrelated by a model matrix representing a resolution degradation in a measurement process of capturing the images in the sequence, and the processor is configured to apply the recovery process by estimating a diagonal vector of a matrix representing the super-resolution autocorrelation matrix. In yet another embodiment, the recovery process is defined by a optimization problem using an objective function that depends on the temporal correlation function and on the model matrix, and the processor is configured to apply the recovery process by solving the optimization problem under a sparsity or compressibility constraint.

In some embodiments, the processor is configured to solve the optimization problem by applying a sequence of iterations for converging to a global minimum of the optimization problem under the sparsity or compressibility constraint, and updating in each iteration a gradient value of the objective function. In other embodiments, a structured matrix derived from the model matrix has a Block Circulant with Circulant Blocks (BCCB) structure, and the processor is configured to update the gradient value by performing a matrix-by-vector multiplication operation with the structured matrix using FFT-based operations.

In an embodiment, the optimization problem is formulated under a Total Variation (TV) constraint. In another embodiment, the optimization problem is formulated in a domain in which the solution is sparse or compressible. In yet another embodiment, the optimization problem includes a non-convex optimization problem, and the processor is configured to solve the optimization problem using greedy methods.

There is additionally provided, in accordance with an embodiment that is described herein, a method for imaging including receiving a sequence of images of an object acquired at respective acquisition times, the object is labeled with fluorescent emitters. The images depict intensity fluctuations of emitters on an acquisition grid, the intensity fluctuations being uncorrelated among the emitters and during an overall time over which the images in the sequence are acquired. A temporal correlation function of the intensity fluctuations is calculated over the sequence of images. Locations of the emitters are estimated on a super-resolution grid having a higher resolution than the acquisition grid, by applying to the temporal correlation function a recovery process in which the locations on the super-resolution grid are assumed to be sparse or compressible in a predefined domain. The recovery process includes a sparse-recovery process or a regularized process.

These and other embodiments will be more fully understood from the following detailed description of the embodiments thereof, taken together with the drawings in which:

DETAILED DESCRIPTION OF EMBODIMENTS

Overview

Figure 1:
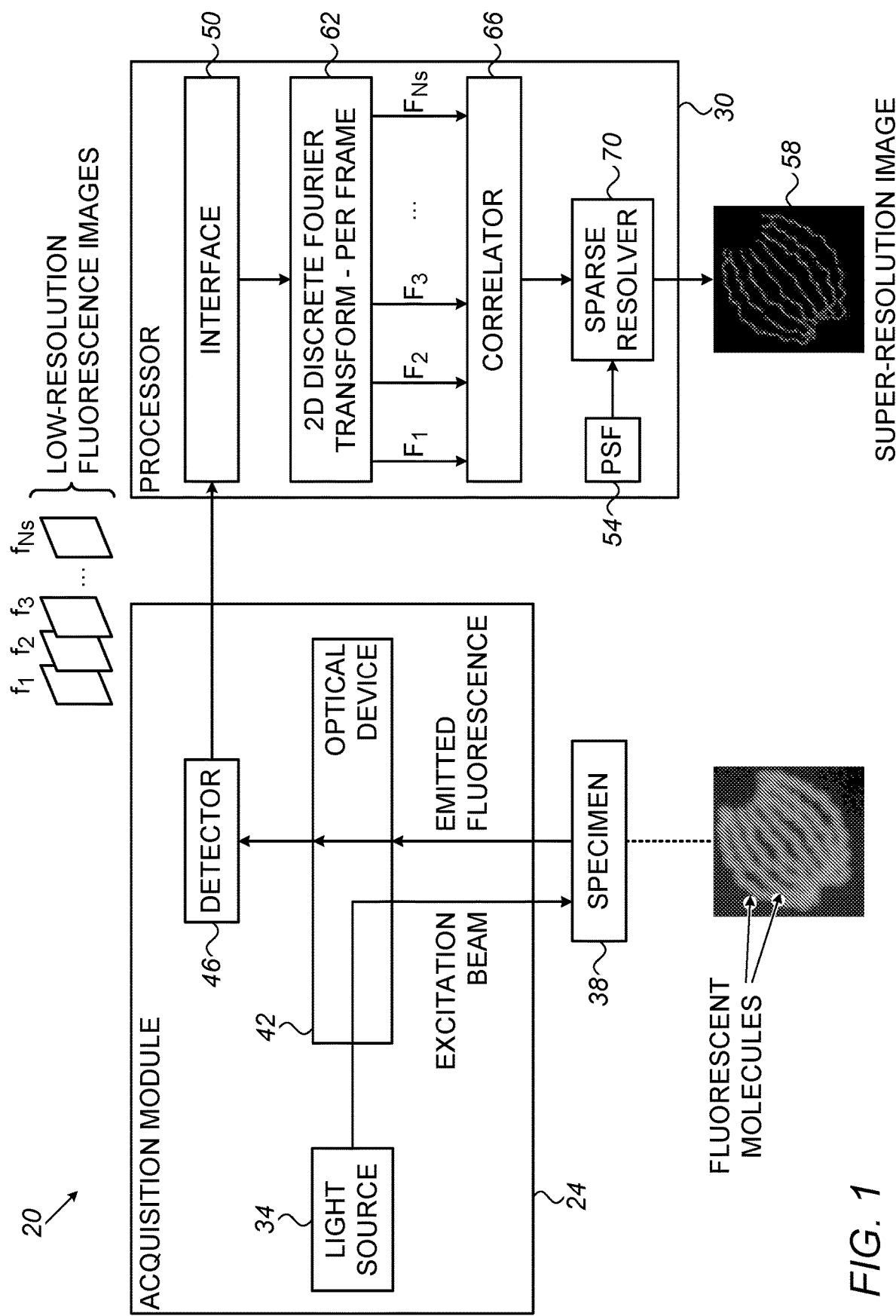
FIG. 1 is a block diagram that schematically illustrates a fluorescent-based imaging system, in accordance with an embodiment that is described herein.

Embodiments that are described herein provide improved methods and systems for fluorescence imaging providing both high spatial resolution and high temporal resolution. The disclosed techniques exploit correlation information from low-resolution fluorescence images. Based on the correlation information and assuming sparsity, the locations of the fluorescent emitters are estimated on a super-resolution grid, using sparse-recovery or regularization methods.

Super-localization imaging methods such as PALM and STORM typically use low fluorophores density so that individual emitters can be identified and localized accurately. Such localization methods, however, typically require tens of thousands exposures to ensure that all fluorophores are activated during the acquisition period, which makes these methods unsuitable for dynamic imaging, e.g., of living cells.

One approach to improve temporal resolution, which is adopted in SOFI, is to increase the fluorophores density in the specimen. This, however, may result in overlapping emitters in individual captured images, which emitters are difficult to localize separately. Practical implementations of SOFI improve the resolution over the diffraction limit by a modest factor of about $\sqrt{2}$.

In some of the disclosed embodiments, a processor receives a sequence of fluorescence images of an object acquired at respective acquisition times. The pixel-values in the captured images correspond to intensity fluctuations of emitters on an acquisition grid. The intensity fluctuations are assumed uncorrelated over space and over the acquisition time. The processor calculates a temporal correlation function of the intensity fluctuations over the sequence of images, and estimates the locations of the emitters on a super-resolution grid having a higher resolution than the acquisition grid, by applying to the temporal correlation function a recovery process in which the locations on the super-resolution grid are assumed to be sparse or compressible in some transform domain. The recovery process comprises, for example, a sparse-recovery process or a regularized process.

In some embodiments, the processor calculates the temporal correlation function by calculating variances of the intensity fluctuations, and applies the recovery process to the variances to find locations on the super-resolution grid having nonzero variances.

In some embodiments, the processor transforms the received images to respective vectors in a suitable transform domain, and calculates a temporal correlation matrix based on the transformed vectors, for a selected time-lag. The processor considers off-diagonal elements of the temporal correlation matrix that was derived from the input images in applying the recovery process. In an embodiment, the processor applies the recovery process by solving an optimization problem under a sparsity or compressibility constraint, for estimating a sparse or compressible diagonal vector of a modeled autocorrelation matrix of the intensity fluctuations on the super-resolution grid.

Embodiments for solving the optimization problem iteratively, which are efficient in terms of memory consumption and run time are also disclosed. Such embodiments rely on a block circulant structure of a model matrix designed to calculate a gradient value within the iterations, using Fast Fourier Transform (FFT)-based operations. Other suitable transforms, which admit efficient numerical computations can also be used.

In the disclosed techniques, a high resolution comparable to known super-localization methods is achievable using just several hundreds of images or less, even with high emitter densities and a large number of overlapping emitters in each exposure. The disclosed techniques are applicable in dynamic imaging as required, for example, in the imaging of living cells. Example experimental and simulated results are provided in U.S. Provisional Patent Application 62/456,714, cited above.

System Description

FIG. 1 is a block diagram that schematically illustrates a fluorescent-based imaging system 20, in accordance with an embodiment that is described herein.

In the present example, imaging system 20 comprises a fluorescence microscope that can be used, for example, in high-resolution imaging. System 20 can be used in various applications such as, for example, whole cell imaging, neural imaging in the brain, Three-dimensional (3D) volume imaging of biological samples, and the like.

Imaging system 20 comprises an acquisition module 24 and a processor 30. Acquisition module 24 comprises a light source 34 that illuminates a specimen 38 via an optical device 42. The light source may comprise, for example, a Light Emitting Diode (LED), a laser. Alternatively, any other suitable light source for excitation can also be used. The specimen to be imaged is labeled with fluorescent stains beforehand, e.g., by attaching fluorescent molecules to regions of interest within the specimen.

The optical device directs the excitation light of the source light toward the specimen. In response to the excitation light, the fluorophores emit photons, which the optical device directs to a detector 46. The detector typically comprises a light-sensitive array such as a Charge-Coupled Device (CCD) or an Electron Multiplying CCD (EMCCD) image sensor. Alternatively, any other type of detector, such as a CMOS-based detector, can also be used. Detector 46 detects light emitted by the fluorophores on a Two-Dimensional (2D) acquisition grid. The detector may comprise circuitry (not shown) for signal sampling, amplification, filtering, digitization and the like.

In some embodiments, the acquisition module comprises a mechanism for temporarily exposing the detector to the emitted light. In one exposure operation, the detector produces a low-resolution image in which brighter areas correspond to fluorophores emitting at higher intensities.

In an image produced by detector 46, a single point emitter is observed blurred, due to the PSF of the underlying imaging system (e.g., acquisition system 24,) which limits the ability to distinguish between close emitters.

In some embodiments, acquisition module 24 acquires a sequence of images by exposing detector 46 to the fluorescence emitted from the specimen multiple times. In the example of FIG. 1, the acquisition module generates a sequence of Ns images (also referred to herein as frames) denoted $f_1 \ldots f_{Ns}$. The images produced have a low-resolution, such as 64-by-64 pixels per image, or any other suitable image dimensions.

Optical device 42 may comprise, for example, light filters (not shown) for selecting desired wavelength-ranges of the excitation light, the emitted fluorescence, or both. Optical device 42 may additionally comprise a beam splitter (not shown) for directing the excitation light toward the specimen, and the emitted fluorescence toward the detector. The described configuration of optical device 42 is, however, not mandatory, and any other suitable optical device configuration can also be used.

In some embodiments, to reduce the total acquisition time and/or the number of captured images, the specimen is labeled with high density fluorophores. Alternatively or additionally, the intensity of the excitation light of the light source is increased. As a result, the probability of neighboring fluorophores being activated simultaneously increases. Emitters that are indistinguishable on the acquisition grid due to the system PSF are also referred to herein as "overlapping emitters."

Processor 30 receives the sequence of captured images from acquisition module 24 via an interface 50, and produces based on these images and on a PSF 54 of the underlying system, a super-resolution output image 58 having a resolution significantly higher than the resolution of the acquisition grid.

In some embodiments, processor 30 applies a 2D Discrete Fourier Transform 2D-DFT to the received images to transform them from the spatial domain to the frequency domain, using a 2D-DFT transformer module 62. The 2D-DFT transformer thus converts the input images $f_1 \ldots f_{Ns}$ to respective frequency-domain images denoted $F_1 \ldots F_{Ns}$.

A correlator 66 calculates, for a selected time-lag, a correlation function, based on the frequency-domain images $F_1 \ldots F_{Ns}$. The correlation function may calculate, for example, the variances of the intensity fluctuations of the respective emitters. Assuming an M-by-M resolution of the frequency-domain images, the output of correlator 66 may comprise an $M^2$-by-$M^2$ correlation matrix.

Processor 30 comprises a sparse resolver 70, configured to apply optimization methods such as a sparse-recovery process or a regularized process.

Sparse resolver 70 generates based on the correlation matrix and PSF 54, an output image 58 on a super-resolution grid. Output image 58 is a super-resolution image, whose resolution is much higher than the resolution of the acquisition grid of the captured images.

Assuming that the specimen contains L active emitters, the sparse resolver applies a suitable sparse-recovery process or a regularized process to estimate the locations of the L emitters on the super-resolution grid. Example sparse-recovery and regularized methods will be described in detail below.

The system configuration of FIG. 1 is an example configuration, which is chosen purely for the sake of conceptual clarity. In alternative embodiments, any other suitable system configuration can be used. The elements of imaging system 20 may be implemented using hardware. Digital elements can be implemented, for example, in one or more off-the-shelf devices, Application-Specific Integrated Circuits (ASICs) or FPGAs. Analog elements can be implemented, for example, using discrete components and/or one or more analog ICs. Some system elements may be implemented, additionally or alternatively, using software running on a suitable processor, e.g., a Digital Signal Processor (DSP). Some system elements may be implemented using a combination of hardware and software elements.

In some embodiments, some or all of the functions of imaging system 20 may be implemented using a general-purpose processor, e.g., processor 30, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

System elements that are not mandatory for understanding of the disclosed techniques, such as circuitry elements related to the internal structure of the components of acquisition module 24, e.g., of optical device 42.

Imaging Signal Model

The input images $f_1 \ldots f_{Ns}$ provided to processor 30 by acquisition module 24 are M-by-M images, captured by detector 46 on a low-resolution acquisition grid. For example, the input images may comprise 64-by-64 pixels. The spacing of the acquisition grid (i.e., pixel size) in each dimension is denoted $\Delta_L$. Assume that the underlying specimen contains a number L of active fluorescent emitters at respective 2D coordinates $[m_k, n_k]$, k=0 . . . L−1. The signal representing the input images is given by:

$$f[m\Delta_L, n\Delta_L, t] = \sum_{k=0}^{L-1} u[m\Delta_L - m_k, n\Delta_L - n_k] S_k(t),$$

$$m, n = 0 \ldots M - 1$$

Equation 1

In Equation 1, $u[m\Delta_L, n\Delta_L]$, m, n=0 . . . M−1 denotes the PSF of the imaging system, sampled on the same low-resolution acquisition grid as the input images. The PSF u[•] is assumed to be known, or otherwise estimated. Further in Equation 1, $S_k(t)$ is a fluctuation function that models the temporal intensity-fluctuations of the $k^{th}$ emitter indexed in the range 0 . . . L−1.

Consider an N-by-N super-resolution grid on which the L emitters are to be located. The spacing of the super-resolution grid is denoted $\Delta_H$. Using these notations, the spacing of the low-resolution and super-resolution grids are related by $[m_k, n_k] = [i_k, j_k]\Delta_H$ for some $i_k, j_k = 0 \ldots N-1$, wherein $N = P \cdot M$ is typically much larger than M. $P > 1$ is an integer, e.g., $P = 8$.

Using the super-resolution grid notation, Equation 1 can be rewritten as:

$$f[m\Delta_L, n\Delta_L, t] = \sum_{k=0}^{L-1} u[m\Delta_L - i_k\Delta_H, n\Delta_L - j_k\Delta_L]S_k(t), \quad \text{Equation 2}$$

$$m, n = 0 \ldots M - 1$$

To summarize, the input signal is represented on a low-resolution M-by-M acquisition grid, whereas the output image should be reconstructed on an N-by-N super-resolution grid, wherein $N \gg M$.

On the super-resolution grid, a pixel at a location $[i_k, j_k]$ corresponds to an emitter detected by detector 46 on the low-resolution acquisition grid. In some embodiments, the pixel values of the super-resolution grid recover the variances of the emitters' intensities, as will be described below. Equation 2 can also be written as:

$$f[mP, nP, t] = \sum_{i=0}^{N-1}\sum_{j=0}^{N-1} u[mP - i, nP - j]S_{i,j}(t), \quad \text{Equation 3}$$

$$m, n = 0 \ldots M - 1$$

wherein $\Delta_L = P \cdot \Delta_H$ for some integer $P > 1$, and the double sum is carried out over all possible emitter coordinates, of which only L locations correspond to the L active emitters. In Equation 3, $S_{i,j}(t)$ is an N-by-N matrix in which only L elements are nonzero.

Next consider each of the low-resolution input images $f_1 \ldots f_{Ns}$ being transformed to the frequency domain by applying to the M-by-M images an M-point 2D-DFT as follows:

$$F[k_m, k_n, t] = \sum_{m=0}^{M-1}\sum_{n=0}^{M-1} f[mP, nP, t]W_N^{k_m m}W_N^{k_n n}, \quad \text{Equation 4}$$

$$k_m, k_n = 0 \ldots M - 1$$

wherein $W_N = e^{-j2\pi/N}$. Substituting the signal of Equation 3 into Equation 4 gives:

$$F[k_m, k_n, t] = U^F[k_m, k_n]\sum_{i=0}^{N-1}\sum_{j=0}^{N-1} W_N^{k_m m}W_N^{k_n n}S_{i,j}(t), \quad \text{Equation 5}$$

$$k_m, k_n = 0 \ldots M - 1$$

wherein $U^F[k_m, k_n]$ is the M-by-M 2D-DFT of the system PSF sampled on the low-resolution grid—$u[m\Delta_L, n\Delta_L]$, $m, n = 0 \ldots M-1$.

In order to formalize Equation 5 in a matrix form, let $y(t)$ denoted a vector of length $M^2$ produced by stacking the M columns of the transformed frame $F[k_m, k_n, t]$ of Equation 5. In addition, Let $s(t)$ be a vector of length $N^2$ produced by stacking the N columns of $S_{i,j}(t)$. $s(t)$ is assumed sparse or compressible is a suitable domain. Using these vector notations, Equation 5 can be rewritten as:

$$y(t) = As(t) \quad \text{Equation 6.}$$

wherein the model matrix A having dimensions $M^2$-by-$N^2$ is given by:

$$A = H(F_M \otimes F_M) \quad \text{Equation 7:}$$

in which $H = \text{diag}\{U^F[0,0] \ldots U^F[M-1, M-1]\}$ is an $M^2$-by-$M^2$ diagonal matrix, whose diagonal contains all the elements of $U^F[.]$, i.e., the M-by-M 2D-DFT of the PSF noted above. For example, the first M elements on the diagonal of H correspond to the first column of $U^F$, the next M elements on the diagonal of W correspond to the second column of $U^F$, and so on. The model matrix A represents a resolution degradation in the measurement process of capturing the input images, e.g., due to the system PSF.

The symbol $\otimes$ denotes the Kronecker multiplication operator, and $F_M$ is a partial M-by-N DFT matrix, created by taking the M rows of a full N-by-N DFT matrix corresponding to the lowest M frequency components. For example, let $F_N$ denote a full N-by-N DFT matrix whose spatial frequency indices run between $-N/2+1$ and $N/2$, $F_M$ can be constructed by taking the M rows of $F_N$ whose frequency indices run between $-M/2+1$ and $M/2$. The elements of the matrix $F_N$ have the form:

$$F_N[k, l] = e^{-j\frac{2\pi}{N}kl}.$$

In the model of Equation 6, $s(t)$ is a sparse vector having only L nonzero elements, corresponding to the L emitters (out of the total super-resolution $N^2$ elements.)

Sparsity in the Correlation Domain

In order to estimate the locations of the L emitters on the super-resolution grid, we formalize a sparse-recovery problem in a correlation domain. To this end, we use the following three assumptions, although other assumptions are possible as well:

A1—The locations of the emitters are assumed unchanging during the acquisition period. This assumption is not mandatory for the disclosed techniques, and is made for simplicity.

A2—The emissions from different emitters, represented by the fluctuation function $S_k(t)$ of Equation 2, are statistically uncorrelated over time, i.e., $E\{S_i(t1)S_j(t2)\} = 0$ for all $i \neq j$, and for all t1 and t2.

A3—The fluctuation function $S_k(t)$ of Equation 2 is wide sense stationary, meaning that its statistical properties do not change during the acquisition period.

The assumptions above justify mathematically the usage of correlation information. Let $\tau$ denote a selected time-lag, $R_y(\tau)$ denote the autocorrelation of the measurement vector $y(t)$, and $R_s(\tau)$ denote the autocorrelation of the unknown vector $s(t)$. Using these notations and based on Equation 6 we have:

$$R_y(\tau) = AR_s(\tau)A^H \quad \text{Equation 8:}$$

In Equation 8, $R_y(\tau)$ is an $M^2$-by-$M^2$ matrix, and $R_s(\tau)$ is an $N^2$-by-$N^2$ matrix. Since by assumption A2 above the emitters are uncorrelated, $R_s(\tau)$ is a diagonal matrix, whose diagonal elements are represented as a diagonal vector $r_s(\tau)$. Since only L elements of $s(t)$ are nonzero the $N^2$ elements of the diagonal $r_s(\tau)$ form an L-sparse vector.

Note that the support of the diagonal vector $r_s(\tau)$ is the same as the support of the unknown vector $s(t)$, which in turn corresponds to the locations of the L emitters on the super-resolution grid.

In some embodiments, the autocorrelation of the measurement vector $y(t)$ is estimated empirically by correlator 66 as:

$$R_y(\tau) = \frac{1}{T-\tau}\sum_{t=1}^{T-\tau}(y(t)-\bar{y})(y(t+\tau)-\bar{y})^H \qquad \text{Equation 9}$$

wherein $\bar{y}$ is the mean value of $y(t)$ given by $$\bar{y} = \frac{1}{T}\sum_{t=1}^{T}y(t)$$

and the operator $(\bullet)^H$ denotes the complex-conjugate operator. In some embodiments, the time parameter t in Equation 9 is the integer index $1 \ldots N_s$ of the input or transformed images $F_1 \ldots F_{N_s}$. Alternatively, t may comprise any other suitable time parameter such as the capturing instances of the input images.

As noted above, $R_s(\tau)$ is an $N^2$-by-$N^2$ diagonal matrix, and therefore, for a zero time-lag Equation 8 can be expressed as:

$$R_y(0) = \sum_{l=1}^{N^2} a_l a_l^H r_{s_l}(0) \qquad \text{Equation 10}$$

wherein $r_{s_l}(0)$ is the $l^{th}$ element of the diagonal vector $r_s(0)$, and $a_l$ is the $l^{th}$ column of A. For the sake of simplicity, we denote $x=r_s(0)$, and formulate the following convex optimization problem:

$$\hat{x} = \min_{x \geq 0}\{\lambda\|x\|_1 + f(x)\} \qquad \text{Equation 11}$$

wherein $f(x)$ is given by:

$$f(x) = \frac{1}{2}\left\|R_y(0) - \sum_{l=1}^{N^2} a_l a_l^H x_l\right\|_F^2 \qquad \text{Equation 12}$$

The optimization problem is solved under a sparsity or compressibility constraint. For a zero time-lag, the solution to the optimization problem recovers the variances of the emitters' intensities. Equation 10 can be formulated similarly for a nonzero time-lag, as $R_y(\tau)=\Sigma_{l=1}^{N^2} a_l a_l^H r_{s_l}(\tau)$. For this case, in an embodiment, the optimization problem can be solved using $R_y(\tau)$ under a sparsity constraint without the $x \geq 0$ constraint.

In Equations 11 and 12, $\lambda$ is a regularization parameter, $\|\bullet\|_F$ is the Frobenius norm and $\|\bullet\|_1$ is the norm-1 regularizer that promotes finding a sparse solution x. In addition, $f(x)$ in Equation 12 enforces consistency of the equations in the equation-system of Equation 8 above. Equation 12 uses the square of the Frobenius norm, i.e.,  sums the square absolute values over all the elements of its matrix argument. Other techniques to solve for x are possible using more general sparse recovery or regularization methods. These techniques include, but are not limited to, non-convex optimization methods (e.g., majorization-minimization approaches such as reweighted $l_1$ minimization) and greedy approaches.

Efficient methods for solving the optimization problem of Equations 11 and 12 will be described in detail below.

Sparsity-Based Super-Resolution Imaging in the Correlation Domain

Figure 2:
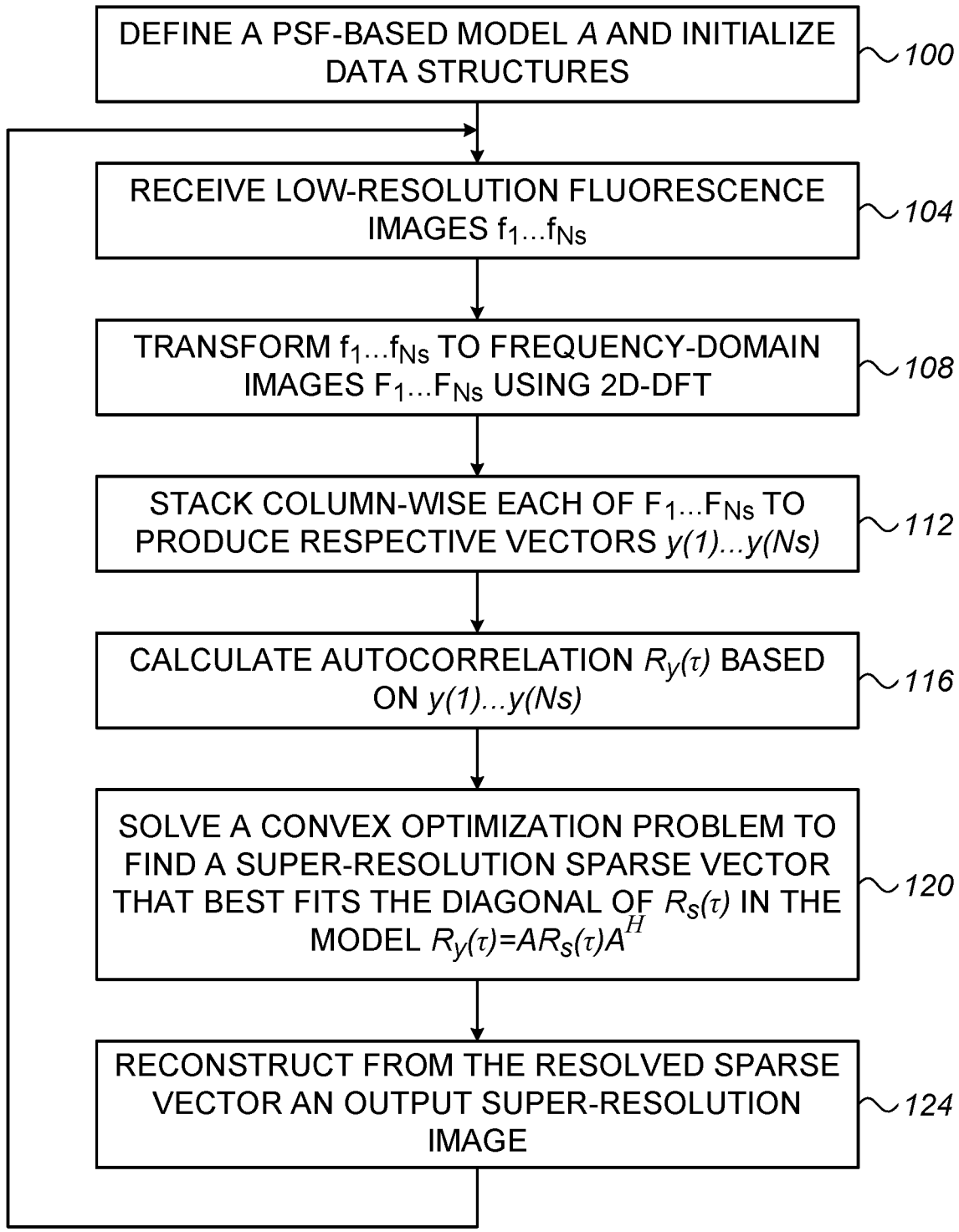
FIG. 2 is a flow chart that schematically illustrates a method for sparsity-based super-resolution imaging in the correlation domain, in accordance with an embodiment that is described herein.

FIG. 2 is a flow chart that schematically illustrates a method for sparsity-based super-resolution imaging in the correlation domain, in accordance with an embodiment that is described herein. The method will be described as carried out by various elements of processor 30 of FIG. 1.

The method begins with processor 30 defining a PSF-based model, at a model definition step 100. In some embodiments, the model is formulated as a matrix $A=H(F_M \otimes F_M)$, wherein H is a diagonal matrix comprising the $M^2$ elements of the M-by-M 2D-DFT of the PSF, as given in Equation 7 above. The PSF may be provided to the processor via a suitable interface, or estimated, as known in the art. The model matrix A relates between the measurement vector $y(t)$ and the unknown super-resolution sparse or compressible vector $s(t)$ as given in Equation 6 above.

At step 100, the processor typically stores certain data structures related to the matrix A that will be used in solving an optimization problem for resolving the super-resolution image. In an efficient embodiment in which the sparse resolver solves an optimization problem iteratively, data structures derived from the PSF that are much smaller than A are initialized and stored, as will be described further below.

At a reception step 104, the processor receives from acquisition module 24, via interface 50, a sequence of low-resolution fluorescence images denoted $f_1 \ldots f_{N_s}$. The low resolution images comprise M-by-M pixels whose values depend on the intensity level of the respective (possibly overlapping) emitters. At a transformation step 108, 2D-DFT transformer 62 transforms each of the low resolution to the frequency domain to produce respective M-by-M frequency-domain images $F_1 \ldots F_{N_s}$, as given in Equation 4 above. Alternatively, other suitable transform domains which admit an efficient numerical implementation can also be used.

At a vectorization step 112, correlator 66 stacks the M columns of each of the frequency-domain images $F_1 \ldots F_{N_s}$ to form respective vectors $y(1) \ldots y(N_s)$, each having $M^2$ elements. Correlator 66 then calculates empirically the $M^2$-by-$M^2$ autocorrelation $R_y(\tau)$ for a selected time-lag $\tau$, as given in Equation 9 above, at a correlation calculation step 116. In the present example, the time instances corresponding to the captured low-resolution images, as well as the selected time-lag are given as integer numbers.

It is important to note that in matrix form, $R_y(\tau)$ typically does not form a diagonal matrix, and that its nonzero off-diagonal elements carry valuable information for resolving the super-resolution image. For the sake of clarity and simplicity we mainly refer to the zero time-lag case, i.e., $R_y(0)$. The disclosed embodiments are similarly applicable to nonzero time-lags as well.

At an optimization problem solving step 120, given $R_y(0)$ and the PSF, e.g., the data structures derived from the PSF at step 100, sparse resolver 70 solves the optimization problem of Equations 11 and 12 under a sparsity constraint. Other suitable regularization forms can also be included.

The sparse resolver may use any suitable method for solving the optimization problem. For example, the sparse resolver may apply a sequence of iterations in an attempt to converge to the global minimum solution of the optimization problem, or at least close to this global minimum. An efficient gradient-based method for solving the optimization problem of Equations 11 and 12 will be described in detail below.

The sparse solution vector x comprises the diagonal elements of the diagonal $N^2$-by-$N^2$ matrix $R_s(\tau=0)$, i.e., $x=r_s(0)$. In general, the optimization problem finds a super-resolution sparse or compressible vector x that best fits the diagonal of $R_s(\tau)$ in the model $R_y(\tau)=AR_s(\tau)\Delta_H$ of Equation 8 above. The term "best fit" refers to best fitting the model in the sense of solving Equations 11 and 12 for the minimum global solution (or close to the global minimum).

At an image reconstruction step 124, the sparse resolver converts the vector x resolved into a 2D super-resolution image by reordering the vector elements as N columns of N elements per column. In some embodiments, for visual purposes, the sparse resolver may additionally smooth the high-resolution image by convolving the image with a suitable small-sized kernel.

Following step 124 the method loops back to step 104 to receive subsequent low-resolution images. Handling such a loop enables dynamic imaging, e.g., of living cells.

Efficient Sparse Recovery Using Fft Operations

In some embodiments, sparse solver 70 solves the optimization problem of Equations 11 and 12 iteratively using a gradient-based method. The iterative procedure requires calculating the gradient $\nabla f(x)$ of the function $f(x)$ of Equation 12 with respect to x. Using the expression of Equation 12, the gradient is given by:

$$\nabla f(x)=Mx-v \qquad \text{Equation 13:}$$

wherein M is an $N^2$-by-$N^2$ matrix derived from A as:

$$M=|A^H A|^2 \qquad \text{Equation 14:}$$

In Equation 14 the squaring operator $|\cdot|^2$ is applied element-wise. The vector V in Equation 13 comprises $N^2$ elements and is given by:

$$v=[a_1^H R_y(0)a_1 \ldots a_{N^2}^H R_y(0)a_{N^2}]^T \qquad \text{Equation 15:}$$

In Equation 15, the operator $[\cdot]^T$ denotes the transpose operator. In some embodiments, the sparse resolver calculates the gradient in Equation 13 efficiently using FFT and $FFT^{-1}$ (i.e., inverse FFT) operations, thus eliminating the need to store the matrices A and/or M which are very large structures.

In some embodiments, given the M-by-M 2D-DFT representation $U^F$ of the PSF, the matrix-by-vector multiplication operation Mx of Equation 13 can be calculated efficiently using FFT operations, without explicitly storing M. Additionally, given the $M^2$-by-$N^2$ matrix A, the vector v in Equation 13 can be calculated efficiently, using FFT operations. A formulation of this sort is described, for example, by Solomon et al. in "SPARCOM: Sparsity Based Super-Resolution Correlation Microscopy," arXiv Preprint, vol. 1707, number 9255, 2017, pages 1-14.

Next we describe an iterative process that sparse resolver 70 applies for solving the optimization problem of Equations 11 and 12 above. The iterative process solves the optimization by updating a gradient value $\nabla f(x)$ of Equation 13 in each iteration. In some embodiments, other regularized methods can also be used, such as, for example, majorization-minimization and greedy methods.

The main signal-based input to the iterative process is $R_y(\tau)$, as calculated, for example, at step 116 of the method of FIG. 2, e.g., using Equation 10.

Input parameters for the iterative process comprise a regularization parameter $\lambda \geq 0$ and the maximal number of iterations $K_{MAX}$. The number of iterations can be set to several tens, e.g., 250 iterations.

The sparse resolver initializes auxiliary variables as follows: $Z_1=x_0=0$, $t_1=1$, and $k=1$. Then the sparse resolver carries out processing iterations as described in the pseudo-code below:

While $k<K_{MAX}$ do:
1. Calculate $\nabla f(z_k)=Mz_k-v$ (Equation 13)
2.

$$x_k = \max\left(\left|z_k - \frac{1}{L_f}\nabla f(z_k)\right| - \frac{\lambda}{L_f}, 0\right) \cdot \text{sign}\left(z_k - \frac{1}{L_f}\nabla f(z_k)\right)$$

3. Project to non-negative orthant, $x_k$ ($x_k<0$)=0
4. $t_{k+1}=0.5 (1+\sqrt{1+4t_k^2})$
5.

$$z_{k+1} = x_k + \frac{t_k-1}{t_{k+1}}(x_k - x_{k-1})$$

6. $k \leftarrow k+1$

When the iteration loop over steps 1-6 terminates, the sparse resolver outputs the most recent vector $x_k=x_{KMAX}$ as the super-resolution solution. In the pseudo-code above, the loop runs over a predefined number of iterations. Alternatively or additionally any other loop termination criteria can also be used.

In the pseudo-code above, $L_f$ is the Lipschitz constant of Equation 13, which equals the maximum eigenvalue of M.

The most computationally intensive part of the iterative process above is the calculation of the gradient value $\nabla f(z_k)= Mz_k-v$ in 1. In some embodiments, the vector v of Equation 15 is calculated once for a given input $R_y(\tau)$, and stored in memory, e.g., as part of the initialization at step 100. As noted above, v is a vector of length $N^2$, which is much smaller than the size of $A-M^2$-by-$N^2$.

The matrix $M=|A^H A|^2$ has a size $N^2$-by-$N^2$, which is typically too large to be stored in memory and/or to be used for multiplication with an $N^2$-by-1 vector. It can be shown that M has a special Block Circulant with Circulant Blocks (BCCB) structure. Based on the BCCB structure, the sparse resolver stores in memory a vector of $N^2$ eigenvalues of M, and calculates $Mz_k$ efficiently using FFT and inverse FFT operations.

Detailed description of the described iterative method and other variants are described, for example, by Solomon at al. in "SPARCOM: Sparsity Based Super-Resolution Correlation Microscopy," arXiv Preprint, volume 1707, number 9255, 2017, pages 1-14, which is incorporated herein by reference.

In some embodiments, the optimization problem of Equation 11 is replaced with the following variant problem:

$$\hat{x} = \min_{x \geq 0}\{\lambda\|Wx\|_1 + f(x)\} \qquad \text{Equation 16}$$

wherein W is a diagonal weighting matrix. In some embodiments, the sparse resolver applies multiple cycles of the pseudo-code above, and updates the weights for each such cycle. In such embodiments, W is initialized to the unity matrix, before performing the first cycle of the pseudo-code. In an embodiment, in the $p^{th}$ cycle, the sparse resolver updates the diagonal of W based on the recent sparse solution as:

$$W_i^{(p+1)} = \frac{1}{|x_i^{(p)}| + \epsilon}, i = 1 \ldots N^2 \quad \text{Equation 17}$$

wherein $\epsilon$ is a positive small-valued parameter that provides stability. In an embodiment, the sparse resolver outputs the solution of the last iterative cycle as the final sparse or regularized solution.

In some embodiments, instead of the optimization problem of Equation 11, sparse resolver 70 solves a variant optimization problem that incorporates a Total-Variation (TV) constraint as given by:

$$\hat{x} = \min_{x \geq 0} \{\lambda TV(x) + f(x)\} \quad \text{Equaiton 18}$$

wherein $f(x)$ is given in Equation 12 above. The TV constraint in Equation 18 can be isotropic, i.e., uniform in all directions, or anisotropic.

Equation 18 can be solved, for example, using the methods described by Beck and Teboulle in "Fast gradient-based algorithms for constrained total variation image denoising and deblurring problems," IEEE Transactions of Image Processing, volume 18, number 11, 2009, pages 2419-2434.

In the embodiments described above, we mainly assume super-resolution sparsity in the spatial domain. In alternative embodiments, sparsity may also be assumed using dictionaries such as wavelet and Discrete Cosine Transform (DCT). In such embodiments, instead of the optimization problem of Equations 11 and 12, the sparse resolver solves a variant optimization as follows:

$$\hat{x} = \min_{x \geq 0} \{\lambda \|T * x\|_1 + f(x)\} \quad \text{Equation 19}$$

wherein $f(x)$ is given in Equation 12 above. In Equation 19, T is the underline transform, e.g., wavelet, DCT, or any other suitable transform. In some embodiments, when using sparse representation using a transform T, and the sparse resolver is designed to find a sparse solution iteratively, the sparse resolver solves the following optimization problem:

$$\hat{x} = \min_{x \geq 0} \{g_\mu(T * x) + f(x)\} \quad \text{Equation 20}$$

in which $g_\mu(\bullet)$ is given by:

$$g_\mu(T^*x) = \min_u \left\{\lambda \|u\|_1 + \frac{1}{2\mu}\|u - T^*x\|_2^2\right\} \quad \text{Equation 21}$$

In such embodiments, a gradient-based method similar to the pseudo-code given above updates a sum-gradient given by $\nabla f(z_k) + \nabla g_\mu(T^*x_{k-1})$.

Pseudo-code variants of the pseudo-code above, adapted for iteratively solving the optimization problems in Equations 16-21, can be found in "SPARCOM: Sparsity Based Super-Resolution Correlation Microscopy," cited above.

The embodiments described above are given by way of example, and other suitable embodiments can also be used. For example, although in the embodiments above we mainly assume square images (M-by-M, and N-by-N) this is not mandatory and non-square images can also be used.

In the embodiments described above we mainly refer to 2D images comprising 2D pixels. The disclosed embodiments are applicable, however, also to 3D images in which 3D voxels replace the 2D pixels.

Although the embodiments described herein mainly address fluorescence super-resolution imaging, the methods and systems described herein can also be used in other applications, such as in photo-acoustics.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An imaging apparatus, comprising:
   an interface, configured to receive a sequence of images of an object acquired at respective acquisition times, wherein the object is labeled with fluorescent emitters, and wherein the images depict intensity fluctuations of emitters on an acquisition grid, the intensity fluctuations being uncorrelated among the emitters and during an overall time over which the images in the sequence are acquired; and
   a processor, configured to:
      calculate a temporal correlation function of the intensity fluctuations over the sequence of images; and
      estimate locations of the emitters on a super-resolution grid having a higher resolution than the acquisition grid, by applying to the temporal correlation function a recovery process in which the locations on the super-resolution grid are assumed to be sparse or compressible in a predefined domain, wherein the recovery process comprises a sparse-recovery process or a regularized process.

2. The apparatus according to claim 1, wherein, in applying the recovery process, the processor is configured to distinguish between the estimated locations of emitters that overlap on the acquisition grid.

3. The apparatus according to claim 1, wherein the processor is configured to calculate the temporal correlation function by calculating variances of the intensity fluctuations, and to apply the recovery process to the variances to find locations on the super-resolution grid having nonzero variances.

4. The apparatus according to claim 1, wherein the processor is configured to transform the received images in the sequence to respective transform-domain vectors, and to calculate the temporal correlation function by calculating a measurement autocorrelation matrix of the transform-domain vectors, for a selected time-lag.

5. The apparatus according to claim 4, wherein the processor is configured to apply the recovery process by considering one or more nonzero off-diagonal elements of the measurement autocorrelation matrix.

6. The apparatus according to claim 1, wherein the temporal correlation function and a super-resolution autocorrelation matrix of the intensity fluctuations of the emitters on the super-resolution grid are interrelated by a model matrix representing a resolution degradation in a measurement process of capturing the images in the sequence, and wherein the processor is configured to apply the recovery process by estimating a diagonal vector of a matrix representing the super-resolution autocorrelation matrix.

7. The apparatus according to claim 6, wherein the recovery process is defined by a optimization problem using an objective function that depends on the temporal correlation function and on the model matrix, and wherein the processor is configured to apply the recovery process by solving the optimization problem under a sparsity or compressibility constraint.

8. The apparatus according to claim 7, wherein the processor is configured to solve the optimization problem by applying a sequence of iterations for converging to a global minimum of the optimization problem under the sparsity or compressibility constraint, and updating in each iteration a gradient value of the objective function.

9. The apparatus according to claim 7, wherein a structured matrix derived from the model matrix has a Block Circulant with Circulant Blocks (BCCB) structure, and wherein the processor is configured to update the gradient value by performing a matrix-by-vector multiplication operation with the structured matrix using FFT-based operations.

10. The apparatus according to claim 7, wherein the optimization problem is formulated under a Total Variation (TV) constraint.

11. The apparatus according to claim 7, wherein the optimization problem is formulated in a domain in which the solution is sparse or compressible.

12. The apparatus according to claim 7, wherein the optimization problem comprises a non-convex optimization problem, and wherein the processor is configured to solve the optimization problem using greedy methods.

13. A method for imaging, comprising:
receiving a sequence of images of an object acquired at respective acquisition times, wherein the object is labeled with fluorescent emitters, and wherein the images depict intensity fluctuations of emitters on an acquisition grid, the intensity fluctuations being uncorrelated among the emitters and during an overall time over which the images in the sequence are acquired;
calculating a temporal correlation function of the intensity fluctuations over the sequence of images; and
estimating locations of the emitters on a super-resolution grid having a higher resolution than the acquisition grid, by applying to the temporal correlation function a recovery process in which the locations on the super-resolution grid are assumed to be sparse or compressible in a predefined domain, wherein the recovery process comprises a sparse-recovery process or a regularized process.

14. The method according to claim 13, wherein, in applying the recovery process, distinguishing between the estimated locations of emitters that overlap on the acquisition grid.

15. The method according to claim 13, wherein calculating the temporal correlation function comprises calculating variances of the intensity fluctuations, and wherein applying the recovery process comprises applying the recovery process to the variances to find locations on the super-resolution grid having nonzero variances.

16. The method according to claim 13, wherein calculating the temporal correlation function comprises transforming the received images in the sequence to respective transform-domain vectors, and calculating the temporal correlation function by calculating a measurement autocorrelation matrix of the transform-domain vectors, for a selected time-lag.

17. The method according to claim 16, wherein applying the recovery process comprises considering one or more nonzero off-diagonal elements of the measurement autocorrelation matrix.

18. The method according to claim 13, wherein the temporal correlation function and a super-resolution autocorrelation matrix of the intensity fluctuations of the emitters on the super-resolution grid are interrelated by a model matrix representing a resolution degradation of a measurement process of capturing the images in the sequence, and wherein applying the recovery process comprises estimating a diagonal vector of a matrix representing the super-resolution autocorrelation matrix.

19. The method according to claim 18, wherein the recovery process is defined by an optimization problem using an objective function that depends on the temporal correlation function and on the model matrix, and wherein applying the recovery process comprises solving the optimization problem under a sparsity or compressibility constraint.

20. The method according to claim 19, wherein solving the optimization problem comprises applying a sequence of iterations for converging to a global minimum of the optimization problem under the sparsity or compressibility constraint, and updating in each iteration a gradient value of the objective function.

21. The method according to claim 19, wherein a structured matrix derived from the model matrix has a Block Circulant with Circulant Blocks (BCCB) structure, and wherein solving the optimization problem comprises updating the gradient value by performing a matrix-by-vector multiplication operation with the structured matrix using FFT-based operations.

22. The method according to claim 19, wherein the optimization problem is formulated under a Total Variation (TV) constraint.

23. The method according to claim 19, wherein the optimization problem is formulated in a domain in which the solution is sparse or compressible.

24. The method according to claim 19, wherein the optimization problem comprises a non-convex optimization problem, and wherein solving the optimization problem comprises solving the optimization problem using greedy methods.

* * * * *